United States Patent
Berkemeier (10) Patent No.: US 11,544,938 B2
(45) Date of Patent: Jan. 3, 2023

(54) SYSTEMS AND METHODS FOR AUTOMATIC LABELING OF IMAGES FOR SUPERVISED MACHINE LEARNING

(71) Applicant: Continental Automotive Systems Inc., Auburn Hills, MI (US)

(72) Inventor: Matthew D. Berkemeier, Beverly Hills, MI (US)

(73) Assignee: Continental Autonomous Mobility US, LLC, Auburn Hills, MI (US)

(*) Notice: Subject to any disclaimer, the term of this patent is extended or adjusted under 35 U.S.C. 154(b) by 338 days.

(21) Appl. No.: 16/685,612

(22) Filed: Nov. 15, 2019

(65) Prior Publication Data

US 2020/0202147 A1 Jun. 25, 2020

Related U.S. Application Data (60) Provisional application No. 62/783,886, filed on Dec. 21, 2018.

(51) Int. Cl.

| | |
|---|---|
| G01C 21/36 | (2006.01) |
| G06V 20/58 | (2022.01) |
| G01S 19/41 | (2010.01) |
| G06N 20/00 | (2019.01) |
| G06T 7/70 | (2017.01) |

(52) U.S. Cl.
CPC ....... *G06V 20/582* (2022.01); *G01C 21/3673* (2013.01); *G01S 19/41* (2013.01); *G06N 20/00* (2019.01); *G06T 7/70* (2017.01)

(58) Field of Classification Search
CPC .................. G06K 9/00818; G01C 21/3673
See application file for complete search history.

(56) References Cited

U.S. PATENT DOCUMENTS

2018/0348777 A1   12/2018   Kawabe

FOREIGN PATENT DOCUMENTS

JP   2018063680 A   4/2018

OTHER PUBLICATIONS

International Search Report and Written Opinion dated Mar. 3, 2020 for the counterpart PCT Application No. PCT/2019/065561.
Loukkal Abdelhak et al: "Improving semantic segmentation in urban scenes with a cartographic information", 2018 15th International Conference on Control, Automation, Robotics and Vision (ICARCV), IEEE, Nov. 18, 2018 (Nov. 18, 2018), pp. 400-406, XP033480729.

(Continued)

*Primary Examiner* — Tuan H Nguyen (57) ABSTRACT

A method of automatic labeling of images for supervised machine learning includes obtaining images of roadside objects with a camera mounted to a vehicle, recording a position and orientation of the vehicle within a defined coordinate system while obtaining the images recording position information for each roadside object with the same defined coordinates system as used while recording the position and orientation of the vehicle, and correlating a position of each of the obtained images of the roadside objects with the position information of each roadside object in view of the recorded position and orientation of the vehicle. The images are labeled to identify the roadside objects in view of the correlated position of each of the obtained images of the roadside objects.

22 Claims, 5 Drawing Sheets

(56) References Cited

OTHER PUBLICATIONS

X Siam Mennatullah et al: "Deep Semantic segmentation for automated driving; Taxonomy, roadmap and challenges" 2017 IEEE 20th International Confernce on Intelligent Trasporation Systems, (ITSC), IEEE, Oct. 16, 2017 (Oct. 16, 2017), pp. 1-8, XP033330377.
Japanese Office Action dated Sep. 14, 2022 for the counterpart Japanese Patent Application No. 2021-535866.

SYSTEMS AND METHODS FOR AUTOMATIC LABELING OF IMAGES FOR SUPERVISED MACHINE LEARNING

TECHNICAL FIELD

The present disclosure relates to systems and processes for generating training and validation data for supervised machine learning.

BACKGROUND

Vehicles manufacturers are increasingly including driver assistant features that use algorithms that interpret information around the vehicle and generate a defined action. Moreover, autonomous features in vehicles utilize information sensed by the vehicle to navigate and operate the vehicle. Supervised machine learning requires large amounts of data including training data, validation data and test data. Depending on the specific problem, thousands, hundreds of thousands, or even millions of examples may be needed to train a machine learning algorithm.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of automatic labeling of images for supervised machine learning, according to an example of this disclosure, includes obtaining images of roadside objects with a camera mounted to a vehicle, recording a position and orientation of the vehicle within a defined coordinate system while obtaining the images recording position information for each roadside object with the same defined coordinates system as used while recording the position and orientation of the vehicle, and correlating a position of each of the obtained images of the roadside objects with the position information of each roadside object in view of the recorded position and orientation of the vehicle. The images are labeled to identify the roadside objects in view of the correlated position of each of the obtained images of the roadside objects.

In a further example of the foregoing, the roadside objects include signs, and a high definition map includes positional information for each sign.

In a further example of any of the foregoing, the method includes correlating a relative position of the vehicle to a position of the sign.

In a further example of any of the foregoing, the method includes correcting a recorded orientation between the sign and the vehicle for optical characteristics of a video recording device.

In a further example of any of the foregoing, the method includes generating a plurality of input-output pairs with the labeled images.

In a further example of any of the foregoing, the labeling step includes providing a marking or outline on each of the roadside objects.

In a further example of any of the foregoing, the defined coordinate system is a Cartesian coordinate system.

In a further example of any of the foregoing, the recording a position and orientation of a vehicle step is performed using a DGPS/IMU system.

In a further example of any of the foregoing, the recording a position and orientation of a vehicle and recording position information for each roadside object steps are performed using a memory device of the vehicle.

In a further example of any of the foregoing, the method includes obtaining a first timestamp data set associated with the images and obtaining a second timestamp data set associated with the position and orientation information. The correlating step includes synchronizing the first timestamp data set and the second timestamp data set.

In a further example of any of the foregoing, the roadside objects include signs, and a high definition map includes positional information for each sign.

In a further example of any of the foregoing, the method includes generating a plurality of input-output pairs with the labeled images.

In a further example of any of the foregoing, the method includes the labeling step, which includes providing a marking or outline on each sign.

In a further example of any of the foregoing, the method includes identifying at least one corner of each sign with a Cartesian coordinate.

A system for automatic labeling of images for supervised machine learning, according to an example of this disclosure, includes a camera mounted to a vehicle and configured to capture images of objects external to the vehicle, a DGPS/IMU system for determining position and orientation information of the vehicle during the capturing of the images of the objects, a memory device for recording the images and the associated position and orientation information, and an HD map including HD map positional information for the objects. At least one computing device is programmed to synchronize the images, the positional and orientation information, and the HD map positional information and to label the objects in the images to provide a second set of images in which the objects are labeled.

In a further example of the foregoing, at least one clock provides a first timestamp data set associated with the images and a second timestamp dataset associated with the position and orientation information.

In a further example of any of the foregoing, at least one computing device includes a vehicle controller in communication with the camera, the DGPS/IMU system, and the HD map.

In a further example of any of the foregoing, the vehicle controller includes the memory device.

These and other features disclosed herein can be best understood from the following specification and drawings, the following of which is a brief description.

DETAILED DESCRIPTION

The present disclosure relates to systems and processes for generating training and validation data for supervised machine learning. In supervised machine learning, the more input-output pairs available, the better the resulting algorithm may be. In some examples, it can be difficult to generate enough instances of the desired output data. In some examples, the data points may be generated manually, which can be error prone and labor intensive.

Supervised machine learning utilizes data points consisting of paired input and output pairs. For each input and output pair, the output is the desired algorithm response to the input. A learning algorithm uses the data pairs by comparing an actual output from the defined output followed by modification of the algorithm in view of the difference.

Figure 1A:
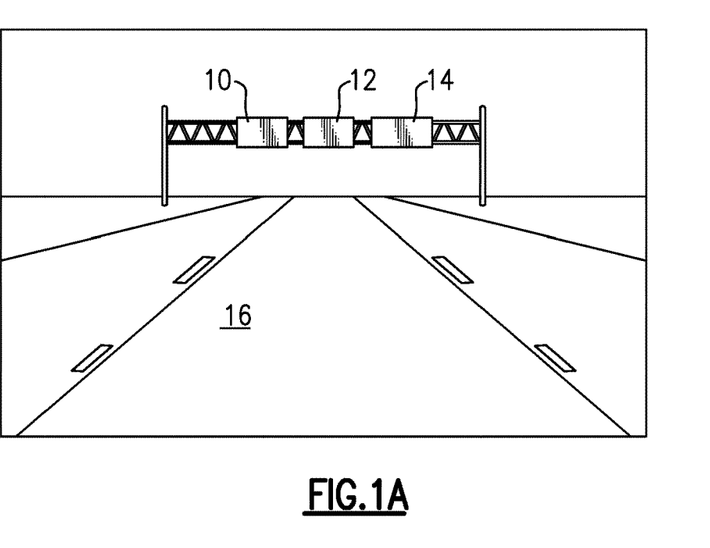
FIG. 1A is a schematic view of an example input for machine learning including roadway signs.
Figure 1B:
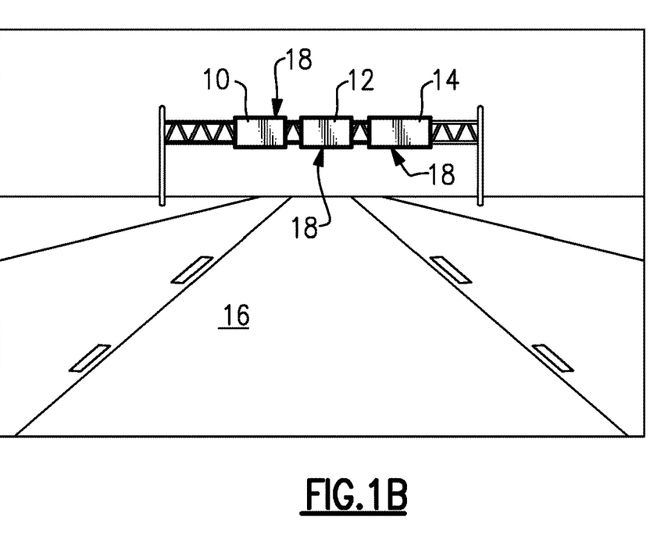
FIG. 1B is a schematic view of an example output for machine learning including labeled roadway signs.

Referring to FIGS. 1A and 1B, an example input-output pair for supervised machine learning is schematically illustrated. The example input-output pair is an example utilized to teach detecting and localizing traffic signs within an image. In the disclosed example, the input is the raw camera image shown in FIG. 1A. The camera image includes signs 10, 12 and 14 suspended across a roadway 16. FIG. 1B represents the output of the image with labels in the form of outlines 18 about each of the signs 10, 12, and 14. In order for an algorithm to learn how to label the images as signs, hundreds of thousands of input-output pairs like those shown in FIGS. 1A and 1B may be utilized. Manual labeling of such the required number of input-output pairs is not efficient.

An example process according to this disclosure automates the labeling of images by using information available as part of high definition (HD) maps for automated driving systems. HD maps suitable for use with automated driving systems contain the locations of traffic signs as longitude, latitude, and altitude values. Values in the HD maps typically include highly accurate location information. Moreover, the HD maps may include a 3-dimensional position along with width, height, and orientation information. The example method utilizes such HD maps to automate labeling of image data for use in supervised machine learning.

Figure 2:
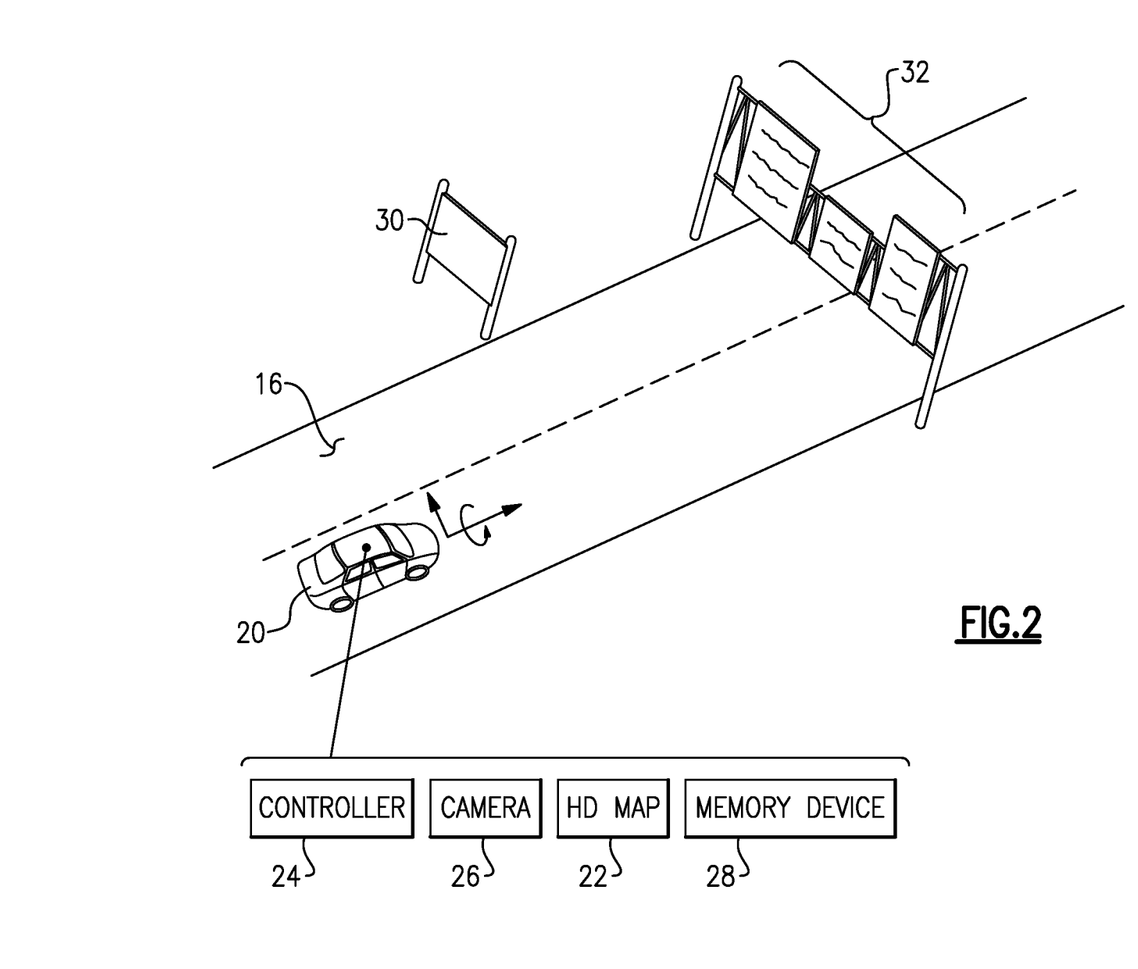
FIG. 2 is a schematic illustration of a vehicle recording information according to an example embodiment.

Referring to FIG. 2, the example process for labeling a set of images with traffic signs utilizes a vehicle 20 that includes an HD map 22 of the roadway including signs 30, 32. In some examples, as shown, the vehicle 20 includes a controller, such as a telematic unit in some examples, schematically indicated at 24, a camera 26, and the HD map 22. Information from the controller 24 records the position of the vehicle 20 and heading with a differential global positioning system/inertial measurement unit (DGPS/IMU) system with high accuracy (e.g. RTK integer mode). In addition, the orientation of the vehicle 20 in the roll, pitch and yaw axis may be saved within a memory device 28 and may also be determined by a DGPS/IMU system in some examples. In some examples, the memory device 28 may be a part of or separate from the controller 24. In some examples, one or more of vehicle position, heading, speed, angular rates, and video are saved on the memory device 28. The measurements from the DGPS/IMU system along with video images from the camera 26 may be saved with timestamp information for later synchronization. The controller 24 provides for an accurate synchronization between video footage and the vehicle 20 position and orientation data.

The information about traffic signs in the HD map 22 is converted to a Cartesian coordinate system, which may be done prior to recording information in some examples. Similarly, data gathered by the controller 24 and camera 26 is also provided in a common Cartesian coordinate system. Accordingly, traffic sign locations and dimensions as well as the vehicle path and orientation are recorded in view of a common coordinate system. The coordinate systems may then be aligned, in some examples at the controller 24 or at a separate computing device, and the vehicle 20 proceeds down the roadway and captures video images of the roadside signs 30, 32 along with the vehicle position and orientation information.

Using the recorded information, a position of each sign 30, 32 relative to the vehicle 20 at each time is computed using methods that account for the speed and orientation of the vehicle 20 relative to the signs 30, 32. Moreover, the optics of the camera 26 may be identified and utilized to further define the accuracy and position of each sign 30, 32.

Figure 3:
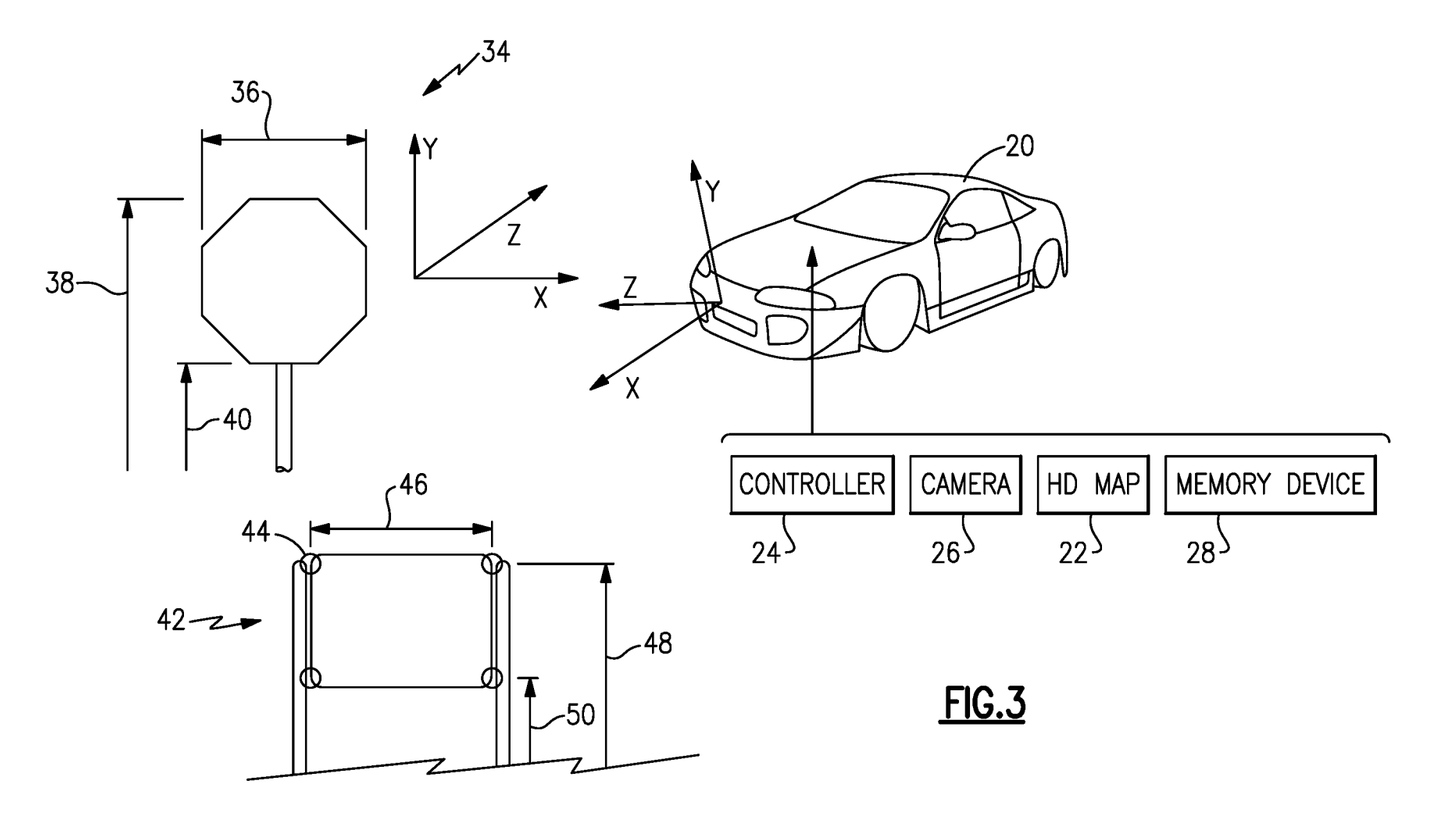
FIG. 3 is a schematic illustration of a vehicle and examples of recorded information according to an example embodiment.

Referring to FIG. 3, with continued reference to FIG. 2, images taken by the camera 26 are synchronized with the width 36 and height 38, 40 information from the HD map 22 of each sign 34 and utilized to label the images from the recording. Labeling is an identification of the signs 34 within the video image to provide an input-output data pair suitable for supervised machine learning. Another example sign 42 includes corners 44 that can be utilized along with the width 46 and height information 48, 50 contained within the HD map 22. The edges and corners of each sign 34, 42 are present within the HD map 22 and enable identification in images captured by the camera 26 as the vehicle 20 moves along the roadway 16. In some examples, the Cartesian coordinates of the corners and/or edges are identified in the images taken by the camera 26 for synchronization with the HD map 22 data. That is, in some examples, the edges and corners are identified in one or both of the HD map 22 and camera 26 images for synchronization.

Each frame of captured video images is aligned with the dimensional and location information contained in the HD map 22. The common coordinate system synchronizes these different sets of data, in some examples at the controller 24 or on a separate computing device, to enable identification of the signs in the video images. In some examples, the synchronization may be done utilizing timestamp information, such as from a central clock or multiple distributed clocks, that is associated with the vehicle state (such as position, orientation, velocity, angular velocity) and the video frames from the camera 26. As the vehicle 20 moves down the roadway 16, hundreds of different images of each sign are obtained and synchronized with the HD map 22 information to enable the generation of a corresponding number of accurate input-output pairs. Each sign's position relative to the video frame may then be computed.

Moreover, in some examples, using a perspective transformation based on the optics of the camera 26 including focal length, the position of each corner 44 of each sign with each image can be computed. In some examples, a camera 26 may have distortion, such as in a fisheye camera, and an associated calibration procedure may be performed on the images.

Accordingly, the location and position of each sign is identified and linked to the video image. The synchronized information is then utilized to generate an image or other representation that includes labels for each traffic sign in each image, which, in some examples, may be done on the controller 24 or on a separate computing device. Accordingly, the labeled images combined with the original nonlabeled images provide the many input-output pairs needed as input for a supervised machine learning process.

As appreciated, the labels may not align perfectly on each image for each sign due to accumulations of slight errors in the information gathered. Inaccuracies can be present in DGPS/IMU information, camera 26 calibration, vehicle 20 orientation errors, as well as within the HD map 22. Accordingly, in some examples, an optical correction can be made to improve the match between labels and the signs. The corrections could be performed manually or with an image processing algorithm. In some examples, an automatic approach to correcting the labels could look for sign edges and make changes to labeling based on the edges to provide better aligned labels. Any increase in accuracy of the labels would result in better input-output pairings for the machine learning process.

Figure 4:
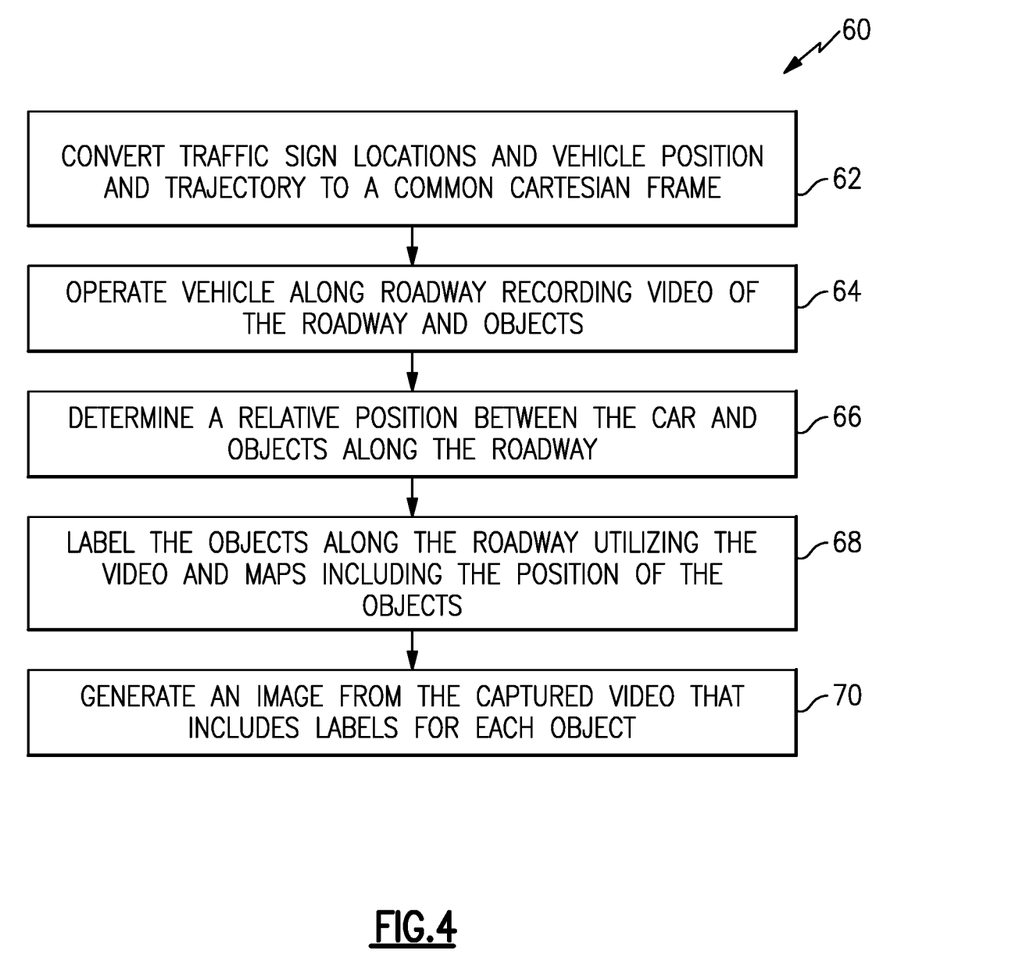
FIG. 4 is a flow diagram illustrating steps of an example embodiment.

Referring to FIG. 4 with continued reference to FIGS. 2 and 3, a schematic representation of the example method is indicated at 60. The method 60 includes the initial step 62 of converting traffic sign location, vehicle position, and trajectory information into a common Cartesian frame. All the traffic sign global positions are converted to a local Cartesian (x, y, z) frame that is common with the vehicle's position and trajectory. It should be appreciated that the conversions could be accomplished after data collection and that other coordinate systems could also be utilized and are within the contemplation of this disclosure.

The vehicle 20 is then operated along the roadway while capturing video images, as is indicated at 64. The video may be recorded while driving and simultaneously recording the car's position and orientation with the controller 24 including an integrated DGPS/IMU system with high accuracy. The vehicle's orientation (e.g. roll, pitch, and yaw) may also be recorded at the same time. Timestamp information associated with the obtained images and position and orientation data may also be recorded, and the timestamps from the images and the position and orientation data may then be synchronized for synchronization of the images and position and orientation data. These latter measurements are commonly also available with an integrated DGPS/IMU system.

After the video image is captured, a relative position between the car and the objects along the roadway is determined as is indicated at 66. Using the recorded information, each sign's position relative to the car (the car frame), at each time, is computed using standard methods. The computations can include information from the HD maps 22 of the 3D position of each corner of each sign along with the sign orientation and the width and height of the sign. The computations also utilize the perspective transformation, such as based on the camera focal length and/or other camera optic parameters, to define the position of each corner of each sign within each image.

Once the location of each sign within each image is computed, the signs may be labeled as is indicated at 68. Labeling includes providing a marking or outline that is usable for defining an input-output pairing. Once labeled, images are generated including the labels to provide the input-output pairs as is indicated at 70.

Figure 5:
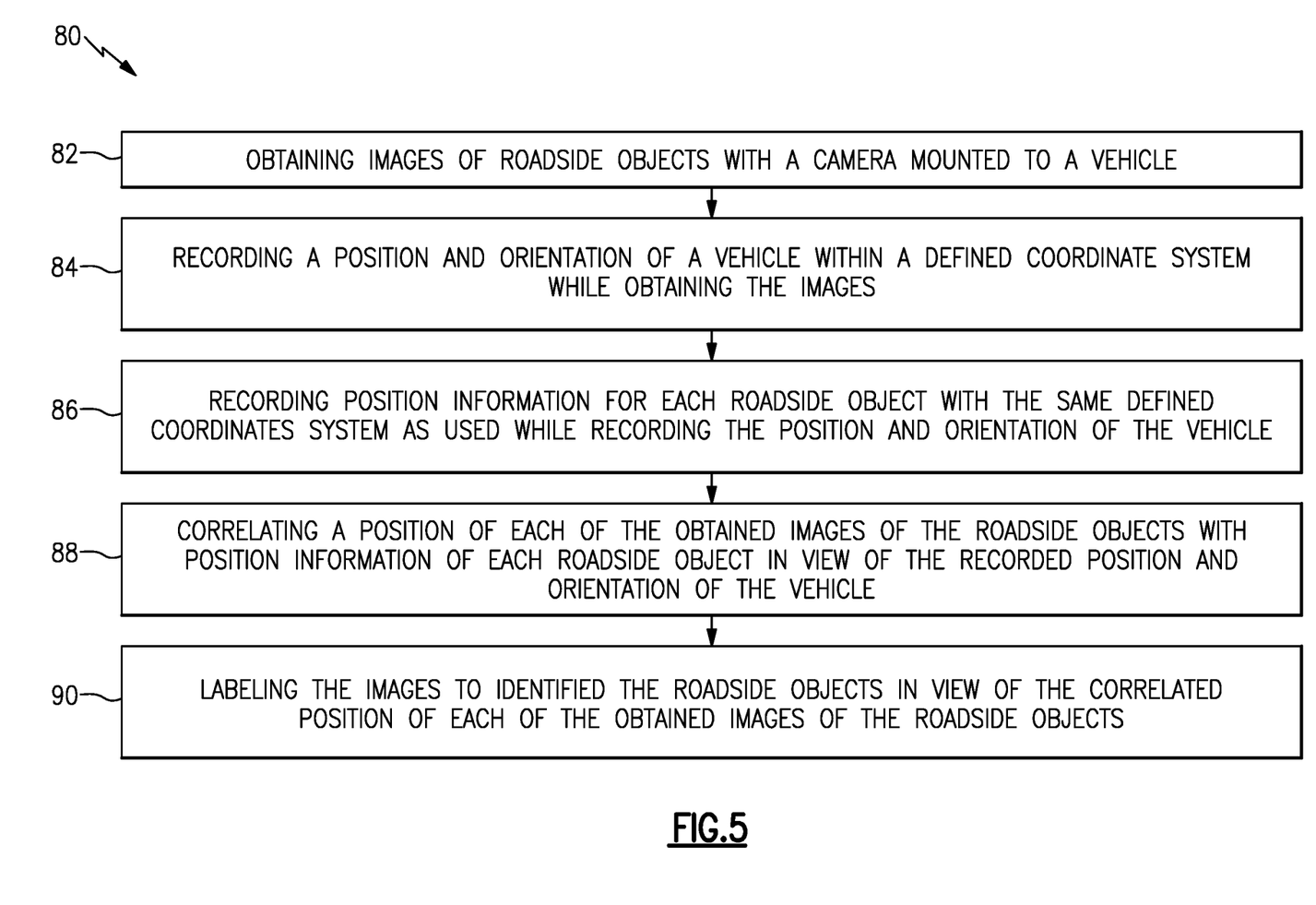
FIG. 5 is a flow diagram illustrating steps of an example embodiment.

Referring to FIG. 5 with continued reference to FIGS. 2-4, a schematic representation of the example method is indicated at 80.

At 82, the method 80 includes obtaining images of roadside objects with a camera mounted to a vehicle.

At 84, the method 80 includes recording a position and orientation of a vehicle within a defined coordinate system while obtaining the images.

At 86, the method 80 includes recording position information for each roadside object with the same defined coordinates system as used while recording the position and orientation of the vehicle.

At 88, the method 80 includes correlating a position of each of the obtained images of the roadside objects with the position information of each roadside object in view of the recorded position and orientation of the vehicle.

At 90, the method 80 includes labeling the images to identify the roadside objects in view of the correlated position of each of the obtained images of the roadside objects.

In some examples, the method 80 includes correlating a relative position of the vehicle to a position of the sign. In some examples, the method 80 includes correcting a recorded orientation between the sign and the vehicle for optical characteristics of a video recording device. In some examples, the method 80 includes generating a plurality of input-output pairs with the labeled images.

Although the example methods 60, 80 are shown in a particular sequence by way of example, other orders of the steps of the methods 60, 80 may be utilized.

It should be understood that although the labeling of roadside signs are disclosed by way of example, other objects could also be labeled for generation of input-output pairs suitable for machine learning and are all within the contemplation and scope of this disclosure.

Accordingly, the example method provides a system for the automated generation of input-output pairs utilized for supervised machine learning processes.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of generating input-output training or validating pairs for supervised machine learning comprising:

obtaining images of roadside objects with a camera mounted to a vehicle;

recording a position and orientation of the vehicle within a defined coordinate system while obtaining the images;

obtaining a position for each roadside object from a high definition map;

converting at least one of the position for each roadside object or the recorded position of the vehicle so as to have the same defined coordinates system;

following the converting, determining a position in each of the obtained images of the roadside objects with the position of each roadside object in view of the recorded position and orientation of the vehicle; and labeling the images to identify the roadside objects in each of the obtained images in view of the corresponding determined position of the roadside objects to create labeled images, each obtained image and corresponding labeled image forming an input-output pair to train or validate a machine learning algorithm to detect roadside objects in images.

2. The method as recited in claim 1, wherein the roadside objects comprises signs.

3. The method as recited in claim 2, further comprising determining a relative position of the vehicle to a position of the sign.

4. The method as recited in claim 3, the method comprising correcting a recorded orientation between the sign and the vehicle for optical characteristics of the camera.

5. The method as recited in claim 1, wherein the labeling comprises providing, in each labeled image, a marking or outline on each of the roadside objects.

6. The method as recited in claim 1, wherein the defined coordinate system is a Cartesian coordinate system.

7. The method as recited in claim 1, wherein the recording a position and orientation of the vehicle is performed using a DGPS/IMU.

8. The method as recited in claim 1, wherein the recording a position and orientation of a vehicle and recording position information for each roadside object are performed using a memory device of the vehicle.

9. The method as recited in claim 1, further comprising
obtaining a first timestamp data set associated with the images;
obtaining a second timestamp data set associated with the position and orientation information; and
wherein the determining a position of the roadside objects in each of the obtained images includes synchronizing the first timestamp data set and the second timestamp data set.

10. The method as recited in claim 9, wherein the roadside objects comprises signs, and the high definition map includes positional information for each sign.

11. The method as recited in claim 1, the labeling comprises providing a marking or outline on each sign.

12. The method as recited in claim 11, the method comprising identifying at least one corner of each sign with a Cartesian coordinate.

13. The method as recited in claim 1, wherein determining the position of the roadside objects in each of the obtained images uses a perspective transform based on parameters of the camera to determine a position of one or more corners of each roadside object.

14. The method as recited in claim 1, further comprising correcting a misalignment between roadside objects appearing in at least one labeled image and the corresponding label therefor, including, for each roadside object in the at least one labeled image, searching for at least one roadside object edge corresponding to the object in the at least one labeled image and correcting alignment of the corresponding label relative to the at least one roadside object in the at least one labeled image based upon the at least one roadside object edge found.

15. A system for generating input-output training or validating pairs for supervised machine learning comprising:
a camera mounted to a vehicle and configured to capture images of objects external to the vehicle;
a DGPS/IMU which determines position and orientation information of the vehicle during the capturing of the images of the objects;
a memory device for recording the images and the associated position and orientation information;
a high definition (HD) map including HD map positional information for the objects; and
at least one computing device programmed to synchronize the capture of the images; with the positional and orientation information of the vehicle, and to label the objects in the images based upon the HD map positional information of the objects and the position and orientation information of the vehicle to provide a set of labeled images in which the objects are labeled, each captured image and the corresponding labeled image forming an input-output training pair for a training a machine learning algorithm.

16. The system as recited in claim 15, comprising
at least one clock for providing a first timestamp data set associated with the captured images and a second timestamp dataset associated with the position and orientation information, wherein the at least one computing device synchronizes the captured images based on the first timestamp data set and the positional and orientation information of the vehicle based on the second timestamp data set.

17. The system as recited in claim 15, wherein the at least one computing device includes a vehicle controller in communication with the camera, the DGPS/IMU and the HD map.

18. The system as recited in claim 17, wherein the vehicle controller includes the memory device.

19. The system as recited in claim 15, wherein the DGPS/IMU determines a position of one or more corners of the objects in each of the obtained images using a perspective transform based on parameters of the camera.

20. The system as recited in claim 15, wherein the roadside objects comprise signs.

21. The system as recited in claim 15, wherein the at least one computing device is further configured to
obtain a first timestamp data set associated with the images;
obtain a second timestamp data set associated with the position and orientation information; and
wherein determining a position of the objects in each of the obtained images includes synchronizing the first timestamp data set and the second timestamp data set.

22. The system as recited in claim 15, wherein the at least one computing device is further programmed to correct a misalignment between one or more objects appearing in at least one labeled image and the corresponding label therefor, including, for each object in the at least one labeled image, searching for at least one object edge corresponding to the object in the at least one labeled image and correcting alignment of the corresponding label relative to the at least one object in the at least one labeled image based upon the at least one object edge found.

* * * * *